(12) United States Patent
Han

(10) Patent No.: US 11,924,314 B2
(45) Date of Patent: Mar. 5, 2024

(54) MESSAGE TRANSMISSION METHOD, MESSAGE TRANSMISSION DEVICE, NETWORK SIDE DEVICE AND STORAGE MEDIUM

(71) Applicants: China Mobile Communication Co., Ltd Research Institute, Beijing (CN); China Mobile Communications Group Co., Ltd., Beijing (CN)

(72) Inventor: Liuyan Han, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 0 days.

(21) Appl. No.: 16/972,037

(22) PCT Filed: Jun. 4, 2019

(86) PCT No.: PCT/CN2019/089960
§ 371 (c)(1),
(2) Date: Dec. 4, 2020

(87) PCT Pub. No.: WO2019/233404
PCT Pub. Date: Dec. 12, 2019

(65) Prior Publication Data
US 2021/0243283 A1   Aug. 5, 2021

(30) Foreign Application Priority Data
Jun. 5, 2018  (CN) .......................... 201810569950.4

(51) Int. Cl.
*H04L 69/24* (2022.01)
*H04J 3/06* (2006.01)
*H04L 61/2517* (2022.01)

(52) U.S. Cl.
CPC ............ *H04L 69/24* (2013.01); *H04J 3/0667* (2013.01); *H04L 61/2517* (2013.01)

(58) Field of Classification Search
CPC ..... H04L 69/24; H04L 61/2517; H04J 3/0667
See application file for complete search history.

(56) References Cited

U.S. PATENT DOCUMENTS 9,450,846 B1 *  9/2016  Huang ................. H04L 43/106
2011/0158120 A1 *  6/2011  Hamasaki ............. H04J 3/0688
                                                              370/252

(Continued)

FOREIGN PATENT DOCUMENTS

CN      1816036 A      8/2006
CN    101789930 A      7/2010

(Continued)

OTHER PUBLICATIONS

"The Implementation of IEEE1588 Clock Synchronization System Based on FPGA", IEEE Instrumentation and Measurement Society, Dalian University of Technology, Jul. 24, 2008.

(Continued)

*Primary Examiner* — Oleg Survillo
*Assistant Examiner* — Monishwar Mohan
(74) *Attorney, Agent, or Firm* — Price Heneveld LLP

(57) ABSTRACT

A message transmission method, a message transmission device, a network side device and a storage medium are provided. The method includes: determining a PTP version of a sending port set by a network side device; sending a first PTP message that uses the PTP version of the sending port through the sending port.

18 Claims, 6 Drawing Sheets

(56) References Cited

U.S. PATENT DOCUMENTS

| | | | | |
|---|---|---|---|---|
| 2011/0170534 A1* | 7/2011 | York | ............... | H04J 3/0667 |
| | | | | 702/89 |
| 2013/0003757 A1* | 1/2013 | Boatright | ........... | H04N 21/4381 |
| | | | | 370/474 |
| 2015/0113174 A1* | 4/2015 | Yang | ............... | H04L 69/28 |
| | | | | 709/248 |
| 2015/0358700 A1* | 12/2015 | Lee | ................ | H04Q 11/0005 |
| | | | | 398/53 |
| 2018/0152286 A1* | 5/2018 | Kemparaj | ............ | H04J 3/0667 |
| 2019/0097914 A1* | 3/2019 | Zhong | ............ | H04J 3/1658 |

FOREIGN PATENT DOCUMENTS

| | | | | | |
|---|---|---|---|---|---|
| CN | 104104606 | A | | 10/2014 | |
| CN | 105450321 | A * | 3/2016 | ............ | H04J 3/0667 |
| CN | 105450321 | A | | 3/2016 | |
| CN | 105610727 | A | | 5/2016 | |
| CN | 106301996 | A * | 1/2017 | ............ | H04L 43/08 |
| CN | 106301996 | A | | 1/2017 | |
| CN | 106790201 | A | | 5/2017 | |
| CN | 106850665 | A | | 6/2017 | |
| CN | 109327428 | A | | 2/2019 | |
| WO | 2013163803 | A1 | | 11/2013 | |

OTHER PUBLICATIONS

Weibel, "Technology Updated on IEEE 1588: The Second Edition of the High Precision Clock Synchronization Protcol," Zurich University of Applied Sciences Insitute of Embedded Systems (InES) (8 pages).

\* cited by examiner

MESSAGE TRANSMISSION METHOD, MESSAGE TRANSMISSION DEVICE, NETWORK SIDE DEVICE AND STORAGE MEDIUM

CROSS-REFERENCE TO RELATED APPLICATION

The present application is the U.S. national phase of PCT Application No. PCT/CN2019/089960 filed on Jun. 4, 2019, which claims a priority of the Chinese patent application No. 201810569950.4 filed on Jun. 5, 2018, which is incorporated herein by reference in its entirety.

TECHNICAL FIELD

The present disclosure relates to the technical field of transmission and network protocols, and in particular to a message transmission method, a message transmission device, a network side device and a storage medium.

BACKGROUND

The services of mobile communication systems, finance, power and other systems require time synchronization between nodes. The network transmission time can use a Precision Time Protocol (PTP) to meet high-precision time requirements. PTP time synchronization is implemented by using a delay computer system. An interface of a master and an interface of a slave device exchange PTP messages to calculate the path delay and time offset between the master device and the slave device to realize the time synchronization between the master device and the slave device. With the improvement of business requirements for synchronization accuracy and the evolution of synchronization technology, the PTP protocol is also constantly evolving, with different versions appearing. Different versions of the PTP protocols represent different time accuracy and processing capabilities. The difference between different versions of the PTP protocols may include filling different values in the meaning or value of some message fields, for example, the field representing the PTP version number. The difference may also include that the new version of the PTP protocol uses the TLV extension field to carry information, and the previous version of the PTP protocol did not use the TLV extension field.

After the appearance of different versions of the PTP time synchronization protocols, the compatibility issues of different versions are incurred. Generally, newly developed devices tend to use the new version of the PTP protocol, carry more information, and identify the device as a new version of the device, so as to facilitate a downstream source to choose a better version of the time source. The new version of the PTP protocol device is usually compatible with the previous version of the PTP protocol. However, it is difficult for devices using the old version of the PTP protocol to be compatible with the new version of the PTP protocol. For example, some values in some fields in the new version are different from those in the previous version, and the device of the previous version receives the new version of the protocol and detects that this field is filled with the new value. It may be considered it as an abnormal message and discard it. For example, if the TLV extension field is used in the new version, the device of the old version, that is, the device using the old version of the PTP protocol, receives the new version of the protocol and detects that the message using the TLV extension field. Since the length of the message is different from that of the previous version of the PTP protocol, it is considered it as an abnormal packet and discard it. In a related technology, the compatibility problem of devices that use different versions of the PTP time synchronization protocol cannot be solved. When the old version of the device receives the new version of the protocol, it is likely to discard the message, resulting in synchronizing abnormally.

As shown in FIG. 1, the time synchronization network includes a mixed networking of devices that use the new and old versions of the PTP protocol, that is, five devices that use the new version of the PTP protocol and four devices that use the old version of the PTP protocol, there is a synchronization protocol compatibility problem between the devices using different PTP protocols, and there is also synchronization protocol compatibility problem between devices that support different versions of the protocol and the benchmark. In order to completely avoid the compatibility problem, the PTP message of the old protocol version needs to be sent on the port where the new device and the old device are connected. However, before the new device is deployed, it is impossible to know which ports of the device will be connected to the old device. Therefore, in the related art, it needs to manually configure each port of each device to send a new or old version of protocol message in a hybrid networking scenario according to the actual network connection situation. When the network contains thousands to tens of thousands of nodes, and each device contains dozens of ports, this configuration method requires a lot of time and effort, and it is easy to cause synchronization problems due to misconfiguration. In addition, when the network topology and a device are changed, reconfiguration has to be implemented. In summary, when manually configuring the communication between devices of the new and old versions of the protocol in the related art, the workload is large, the efficiency is low, it is prone to errors and difficult to maintain.

SUMMARY

The present disclosure is to provide a message transmission method, a message transmission device, a network device and a storage medium, which can solve the problem in the related art that when the message transmission ports and message protocols between devices of the new and old versions is manually configured, the efficiency is low, it is prone to errors and difficult to maintain.

In a first aspect, a message transmission method applied to a network side device is provided. The method includes: determining a PTP version of a sending port set by a network side device; sending a first PTP message that uses the PTP version of the sending port through the sending port.

In some embodiments, if a number of the sending ports is at least two, the determined PTP versions of the at least two sending ports are the same or different.

In some embodiments, the first PTP message comprises at least one of the following: a PTP Announce message, a Sync message, a Follow_Up message, a Delay_Req message, a Delay_Resp message.

In some embodiments, if a state of the sending port is a master clock, the first PTP message includes at least one of the following: a PTP Announce message, a Sync message, a Follow_Up message, a Delay_Resp message; if the state of the sending port is a slave clock, the first PTP message at least includes a Delay_Req message.

In some embodiments, the determining the PTP version of the sending port includes: determining an identified PTP version used by a second PTP message received by the receiving port corresponding to the sending port as the PTP version of the sending port; or determining a PTP version specified by the network side device as the PTP version of the sending port.

In some embodiments, before the determining the PTP version of the sending port, the method further includes: determining whether the receiving port corresponding to the sending port has received the second PTP message.

In some embodiments, the second PTP message comprises at least one of the following: a PTP Announce message, a Sync message, a Follow_Up message, a Delay_Req message, a Delay_Resp message.

In some embodiments, determining the receiving port corresponding to the sending port incudes: if a transmission port type set by the network side device is a bidirectional port, determining the sending port as the receiving port corresponding to the sending port; and if a transmission port type set by the network side device is a unidirectional port, determining the receiving port corresponding to the sending port according to a matching relationship between the receiving port and the sending port.

In some embodiments, the identifying the PTP version used by the second PTP message received by the receiving port corresponding to the sending port comprises at least one of: determining the PTP version used by the second PTP message according to information included in a message field in the second PTP message; determining the PTP version used by the second PTP message according to whether the second PTP message has a Tag Length Value (TLV) extension field; and determining the PTP version used by the second PTP message according to information included in a reserved field in the second PTP message.

In some embodiments, the message field includes at least one of the following: a synchronization domain number field, a PTP version field, and a grandmaster Clock Quality field.

In some embodiments, the message fields include at least one of a PTP profile Specific 1 field and a PTP profile Specific 2 field.

In some embodiments, the determining the PTP version of the sending port is determined by the network side device in an initialization phase; or the determining the PTP version of the sending port is determined through periodic detection by the network side device in a time synchronization phase.

In some embodiments, if the PTP version of the sending port is determined by the network side device in the initialization phase, the second PTP message includes the PTP Announce message.

In some embodiments, the method further includes: if the receiving port has received the second PTP message, and the second PTP message is the PTP Announce message, determining the state of the sending port according to an optimal master clock algorithm; and if the receiving port has not received the second PTP message, determining that the state of the sending port is a master clock.

In some embodiments, the determining whether the receiving port corresponding to the sending port has received the second PTP message includes: for the receiving port corresponding to the sending port, determining whether the second PTP message is received within a preset time period; if no, determining that the receiving port has not received the second PTP message.

In some embodiments, the preset time period is determined according to a message transmission period and a preset number of PTP messages.

In a second aspect, a message transmission device applied to a network side equipment is provided. The device includes: a determining module, configured to determine a PTP version of a sending port set by a network side device; a sending module is configured to send a first PTP message that uses the PTP version of the sending port through the sending port.

In a third aspect, a network side device includes a memory, a processor, and a transceiver. The processor is configured to read the program in the memory, and execute the following process: determining a PTP version of a sending port set by a network side device; controlling the transceiver to send a first PTP message that uses the PTP version of the sending port through the sending port.

In some embodiments, the processor is specifically configured to determine PTP versions of at least two sending ports that are the same or different, wherein a number of sending ports is at least two.

In some embodiments, the processor is specifically configured to determine an identified PTP version used by the second PTP message received by the receiving port corresponding to the sending port as the PTP version of the sending port; or determine a PTP version specified by the network side device as the PTP version of the sending port.

In some embodiments, the processor is further configured to determine whether the receiving port corresponding to the sending port has received a second PTP message before determining the PTP version of the sending port.

In some embodiments, the processor is specifically configured to, if a transmission port type set by the network side device is a bidirectional port, determine the sending port as the receiving port corresponding to the sending port; and if a transmission port type set by the network side device is a unidirectional port, determine the receiving port corresponding to the sending port according to a matching relationship between the receiving port and the sending port.

In some embodiments, the processor is specifically configured to identify the PTP version used by the second PTP message received by the receiving port corresponding to the sending port according to at least one of: determining the PTP version used by the second PTP message according to information included in a message field in the second PTP message; determining the PTP version used by the second PTP message according to whether the second PTP message has a Tag Length Value (TLV) extension field; and determining the PTP version used by the second PTP message according to information included in a reserved field in the second PTP message.

In some embodiments, the processor is specifically configured to determine the PTP version of the sending port in an initialization phase or determine the PTP version of the sending port by periodic detection in a time synchronization phase.

In some embodiments, the processor is further configured to, if the receiving port has received the second PTP message, and the second PTP message is the PTP Announce message, a state of the sending port is determined according to an optimal master clock algorithm; and if the receiving port has not received the second PTP message, it is determined that the state of the sending port is a master clock.

In some embodiments, the processor is specifically configured to determine whether the second PTP message has been received within a preset time period for the receiving port corresponding to the sending port; if no, determining that the receiving port has not received the second PTP message.

In a fourth aspect, a network side device includes a processor, a communication interface, a memory, and a communication bus, wherein the processor, the communication interface, and the memory implement mutual communication through the communication bus; a computer program is stored in the memory, and when the computer program is executed by the processor, the processor implements the steps of the message transmission method.

In a fifth aspect, a computer-readable storage medium that stores a computer program executable by a network side device, and when the program is executed on the network side device, the network side device executes the steps of the message transmission method.

The present disclosure is to provide a message transmission method, a message transmission device, a network device and a storage medium. The method includes: determining a PTP version of a sending port set by a network side device; sending a first PTP message that uses the PTP version of the sending port through the sending port. In the embodiments of the present disclosure, the network side device can determine the sending port for communicating with an opposite device, and send the PTP message that uses the PTP version of the determined sending port through the sending port, without additional manual configuration, thereby improving efficiency and correctness, and improving maintainability.

BRIEF DESCRIPTION OF THE DRAWINGS

In order to more clearly describe the technical solutions in the embodiments of the present disclosure or a related art, the drawings that need to be used in the description or a related are briefly described. Obviously, the drawings in the following description are merely some embodiments, those of ordinary skill in the art can obtain other drawings based on these drawings without creative work.

DETAILED DESCRIPTION

In order to improve the efficiency, accuracy, and maintainability of compatibility between devices using different versions, embodiments of the present disclosure provide a message transmission method, device, network side device, and storage medium.

The message transmission method provided by the embodiments of the present disclosure can be applied to a network side device. The network side device includes a hardware layer and an operating system layer running on the hardware layer.

The hardware layer includes hardware such as a central processing unit (Central Processing Unit, CPU), a memory management unit (Memory Management Unit, MMU), and memory.

The operating system may be any one or more computer operating systems that implement business processing through processes, for example, a Linux operating system, a Unix operating system, or a windows operating system.

In addition, in the embodiments of the present disclosure, the network side device may be located at a network node in the access network or the core network. The type of the network side device is not particularly limited in the embodiment of the present disclosure, as long as the message transmission can be realized through executing the program instruction for implementing the message transmission method according to an embodiment of the present disclosure.

The network side device is provided with multiple ports for information interaction with other network side devices or user terminals. The network side device uses the PTP message which has the PTT version supported by the network side device in the information for interaction with other network side devices or user terminals during time synchronization.

In order to make the objectives, technical solutions and advantages of the present disclosure clearer, the present disclosure will be further described in detail below with reference to the accompanying drawings. Obviously, the described embodiments are only a part of the embodiments of the present disclosure, rather than all the embodiments. Based on the embodiments in the present disclosure, all other embodiments obtained by those of ordinary skill in the art without creative work shall fall within the protection scope of the present disclosure.

Figure 1:
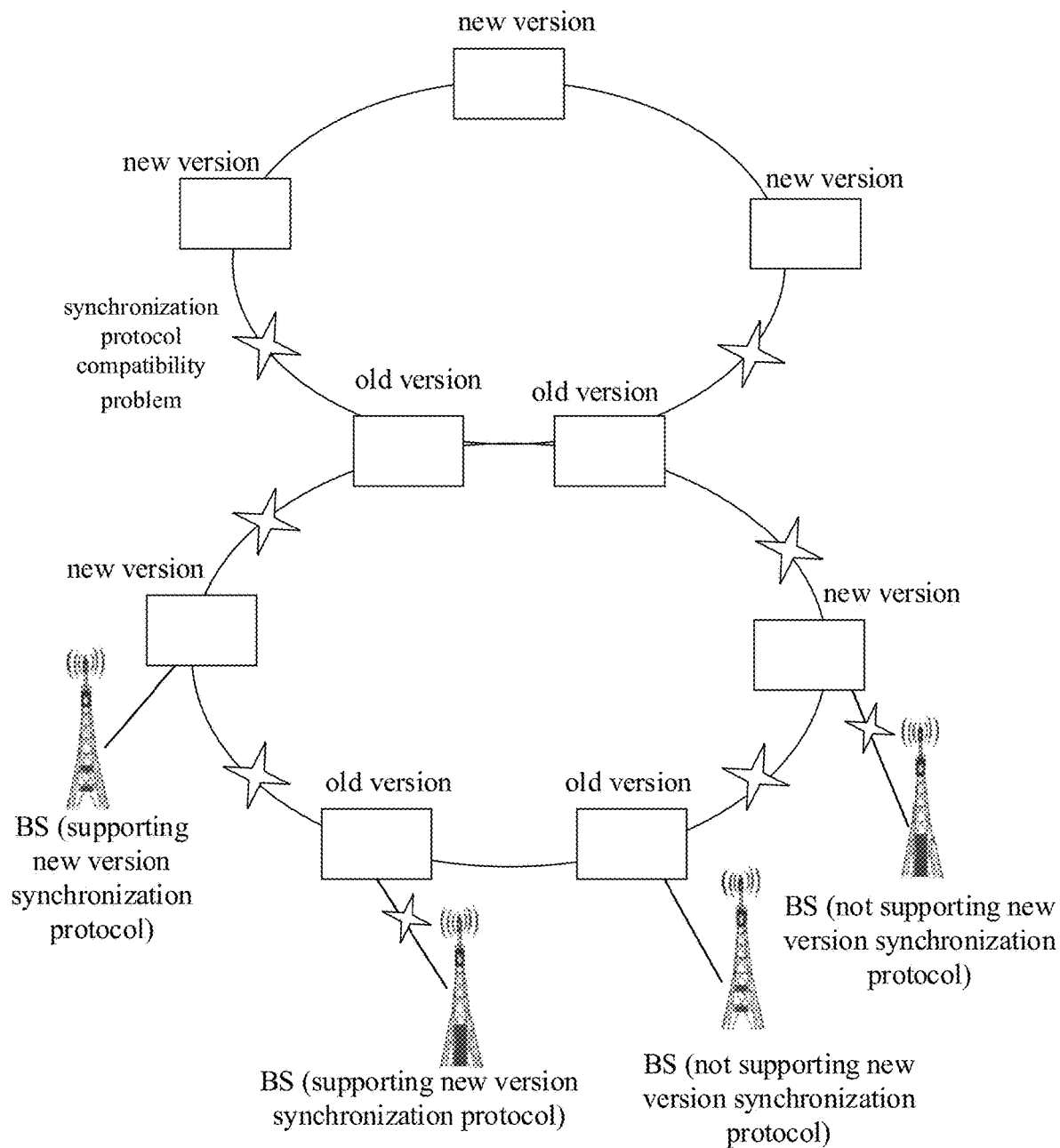
FIG. 1 is a schematic diagram showing a mixed networking of devices using the new and old versions of PTP protocol.
Figure 2:
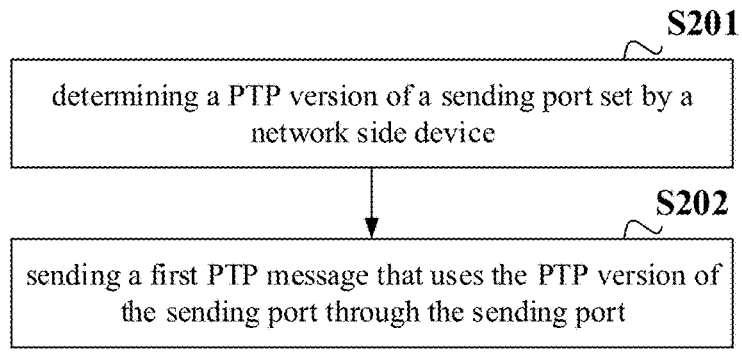
FIG. 2 is a schematic diagram of a process according to an embodiment of the present disclosure.

FIG. 2 is a schematic diagram of a message transmission process according to an embodiment of the present disclosure. The process includes the following steps.

S201: determining a PTP version of a sending port set by a network side device.

The message transmission method provided in the embodiments of the present disclosure is applied to a network side device, and the network side device may be a time server, a time transmission node, a base station, and a terminal device applying the PTP protocol. The network side device is provided with at least one sending port, and usually there are multiple sending ports for the network side device.

The network side device usually saves the determination logic of the PTP version of each sending port, so that the network side device can determine the PTP version of the sending port. If multiple sending ports are set in the network side device, some ports may need to determine the corresponding PTP version thereof, and some ports may have a fixed PTP version. If the number of the sending ports is at least two, it needs to determine that the PTP versions of the at least two sending ports are the same or different.

The network side device is set with the PTP version that it can support during development. Generally, the newly developed network side device can support a new higher PTP version, and the previously developed network side device can support a previous lower PTP version, the network side device that supports the new higher PTP version can be compatible with the previous lower PTP version, while the network side device that supports the previous lower PTP version cannot be compatible with the new higher PTP version, so that the determination mechanism for the PTP version of the sending port is usually related to the PTP version supported by an opposite device corresponding to the sending port.

S202: sending a first PTP message that uses the PTP version of the sending port through the sending port.

After the network side device determines the PTP version of the sending port, it can generate the first PTP message that uses the PTP version of the sending port, and send the first PTP message through the sending port, so that the opposite device can receive the first PTP message and then implements the time synchronization.

The first PTP message includes at least one of the following: a PTP announce (Announce) message, a synchronization (Sync) message, a followup (Follow_Up) message, a delay request (Delay_Req) message, and a delay response (Delay_Resp) message.

In the embodiments of the present disclosure, the network side device can determine the sending port for communicating with the opposite device, and send the PTP message that uses the PTP version of the determined sending port through the sending port, without additional manual configuration, thereby improving efficiency and correctness, and improving maintainability.

In order to further improve the efficiency and correctness of protocol compatibility, on the basis of the above-mentioned embodiments, in the embodiments of the present disclosure, the PTP version used by the second PTP message received by the identified receiving port corresponding to the sending port is determined as the PTP version of the sending port; or the PTP version specified by the network side device is determined as the PTP version of the sending port.

When the network side device determines the PTP version of the sending port, it can be determined according to the PTP message received by the receiving port corresponding to the sending port, or it can be determined according to the specified PTP version, thereby improving the flexibility of protocol compatibility.

Specifically, the network side device may determine the receiving port corresponding to the sending port, and then identifying the PTP version used by the second PTP message received by the receiving port corresponding to the sending port, so as to determine the PTP version used by the second PTP as the PTP version of the sending port.

After it is determined that the receiving port corresponding to the sending port has not received the second PTP message, the network side device may determine that the PTP version specified by the network side device as the PTP version of the sending port. Or whether the receiving port corresponding to the sending port receives the second PTP message, the PTP version specified by the network side device is determined as the PTP version of the sending port.

The PTP version specified by the network side device can be the PTP version specified for each sending port, that is, the PTP version of each sending port can be the same or different, or the PTP version may be specified for the network side device, that is, each sending port has the same PTP version.

The specified PTP version may be the highest PTP version supported by the network side device, or the lowest PTP version supported by the network side device, or the PTP version with the largest usage ratio in the network where the network side device is located.

The second PTP message includes at least one of the following: a PTP Announce message, a Sync message, a Follow_Up message, a Delay_Req message, a Delay_Resp message.

If the determined PTP version of the sending port is related to whether the receiving port corresponding to the sending port receives the second PTP message, before the determining the PTP version of the sending port, the method further includes: determining whether the receiving port corresponding to the sending port has received the second PTP message.

When the network side device determines the PTP version of the sending port, it can be determined according to whether the receiving port corresponding to the sending port has received the PTP message. At this time, the PTP version of the sending port is not fixed, but variable.

The receiving port corresponding to the sending port is stored in the network side device, and the sending port set by the network side device may be set the same as or different from the corresponding receiving port.

The network side device can identify whether the receiving port receives the second PTP message. Specifically, the network side device can determine whether the receiving port receives the second PTP message within a preset time period, or the network side device can determine whether the receiving port receives the second PTP message through the number of PTP messages that are not received.

The network side device determines the PTP version of the sending port according to the determination result of whether the receiving port corresponding to the sending port receives the second PTP message.

Since the network side device that supports the new higher PTP version can be compatible with the previous lower PTP version, the network side device that supports the previous lower PTP version cannot be compatible with the new higher PTP version, so when the PTP version used by the PTP message is not higher than the current PTP version supported by the network side device, the network side device can recognize and receive the second PTP version. When the PTP version used by the second PTP message is higher than the PTP version supported by the current network side device, the network side device discards the PTP message of the PTP version because it cannot recognize the PTP version, so the network side device considers that it has not received the second PTP message.

When the receiving port of the network side device recognizes that the second PTP message is received, it can be considered that the PTP version used by the second PTP message is a PTP version compatible with the network side device. In order to further realize automatic protocol compatibility, the network side device may determine the PTP version used by the second PTP message as the PTP version of the sending port corresponding to the receiving port.

When the receiving port of the network side device does not recognize the second PTP message is received, in order to further realize automatic protocol compatibility, the network side device can send a new version of the PTP message by default to determine the highest PTP version that the network side device can support, and the highest PTP version is determined as the PTP version of the sending port.

The network side device can have multiple receiving ports and their corresponding sending ports. The network side device can independently determine a target PTP protocol of a sending port corresponding to each receiving port according to the message received by each receiving port. For example, if the network side device has N ports, there may be M ports sending the old version of the PTP protocol, and the remaining N-M ports sending the new version of the PTP protocol.

Figure 3:
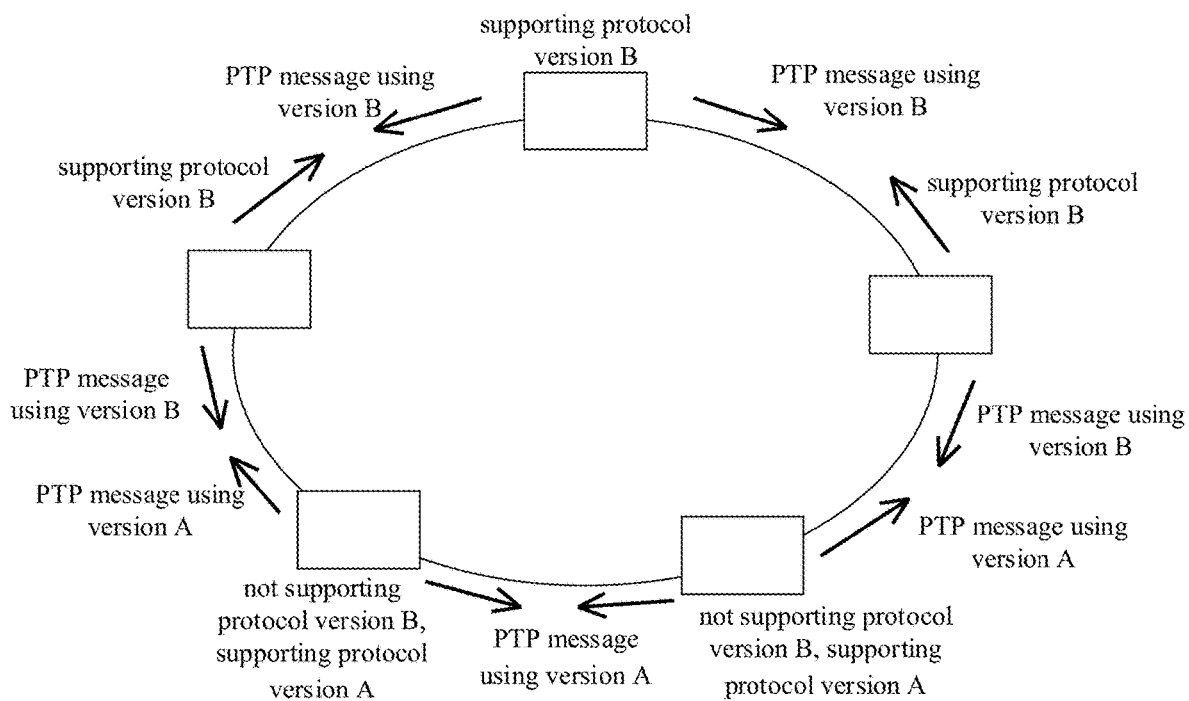
FIG. 3 is a schematic structural diagram of determining a target PTP version in the related art.

The following describes a specific embodiments of the present disclosure. FIG. 3 is a schematic diagram of determining the target PTP version without using the method provided by the embodiments of the present disclosure. As shown in FIG. 3, there are three synchronized devices (that are network side devices) supporting the new protocol version B and two synchronized devices that do not support the new protocol version B but support the protocol version A. The PTP message between two synchronized devices that both support protocol version B is a PTP message using protocol version B, and the PTP message between two synchronized devices that both support protocol version A is a PTP message using protocol version A. When PTP messages are sent between a synchronized device that supports protocol version B and a synchronized device that supports protocol version A, the synchronized device that supports protocol version B always sends PTP messages that use the protocol version B, and the synchronized device that supports protocol version A sends the PTP message that uses the protocol version A, because the synchronized device supporting protocol version A is not compatible with protocol version B, the synchronized device supporting protocol version A cannot recognize the PTP message using the protocol version B, so that the synchronized device supporting protocol version A cannot complete time synchronization.

Figure 4:
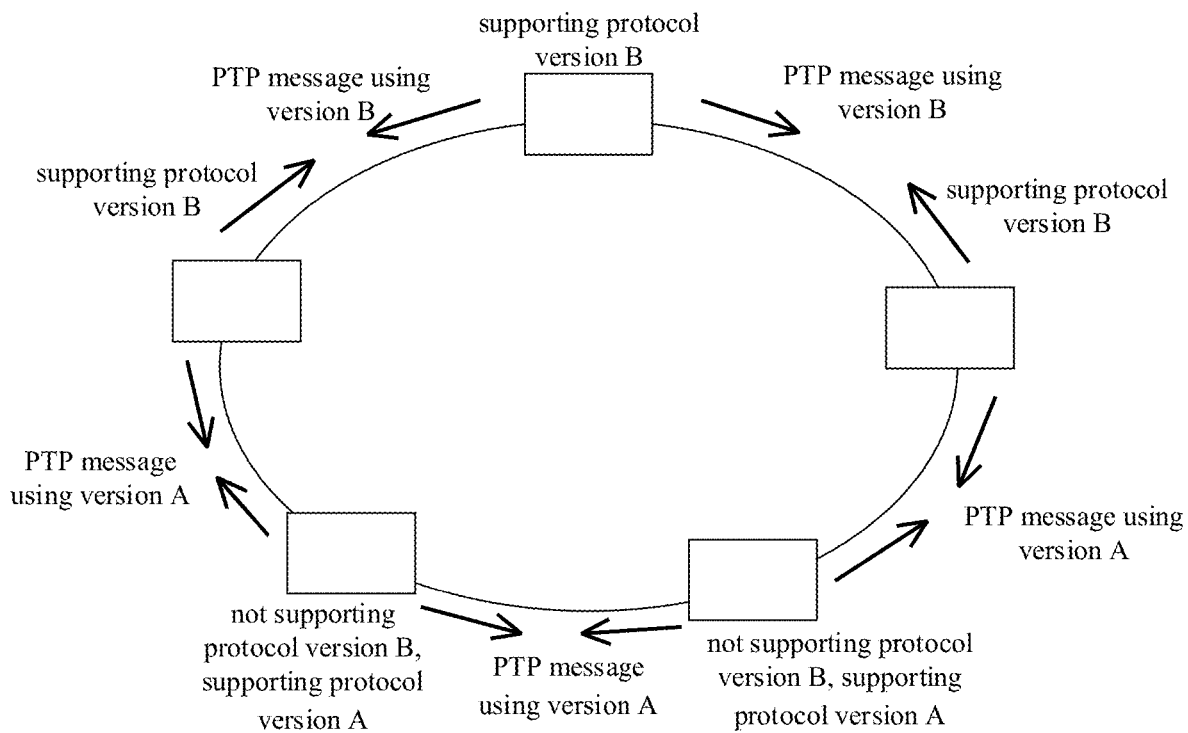
FIG. 4 is a schematic structural diagram of determining a target PTP version according to an embodiment of the present disclosure.

FIG. 4 is a schematic diagram of determining a target PTP version using the method provided by an embodiment of the present disclosure. As shown in FIG. 4, there are three synchronized devices (that are network side devices) that support the new protocol version B and two synchronized devices that do not support the new protocol version B but support protocol version A. When the version of the PTP message received by the synchronized device supporting protocol version B on a port is version A, the version of the PTP message sent by the synchronized device supporting protocol version B on the sending port corresponding to the port is version A. When the version of the PTP message received by a synchronized device supporting protocol version B on a receiving port is version B, the version of the PTP message sent by the synchronized device supporting version protocol B on the sending port corresponding to the port is version B.

Specifically, as shown in FIG. 4, the PTP message sent between two synchronized devices that both support protocol version B is a PTP message using version B, and the PTP message sent between two synchronized devices that both support protocol version A is a PTP message using version A, and when a PTP message is sent between a synchronized device supporting protocol version B and a synchronized device supporting protocol version A, when a synchronized device supporting protocol version B receives a PTP message using the version A from a synchronized device supporting protocol version A, a synchronized device that supports protocol version B will use protocol version A as the target PTP version. When a PTP message is sent to a synchronized device that supports protocol version A, the PTP message that uses version A is sent. Therefore, a synchronized device that supports version A can recognize that a PTP message using version A is received, and complete time synchronization.

The embodiments of the present disclosure can automatically and effectively solve the compatibility problem between different versions of PTP, do not require any update of devices using the old version of the protocol, are suitable for hybrid networking scenarios, and solve the problem of synchronous network evolution.

When the network side device determines the target PTP version of the sending port in the embodiments of the present disclosure, it can be determined according to the PTP message received by the receiving port corresponding to the sending port, or it can be determined according to the specified PTP version, thereby further ensuring the flexibility of automatic protocol compatibility.

On the basis of the foregoing embodiments, in the embodiments of the present disclosure, the determining the receiving port corresponding to the sending port includes: if a transmission port type set by the network side device is a bidirectional port, determining the sending port as its corresponding reception port; and if the transmission port type set by the network side device is a unidirectional port, determining the receiving port corresponding to the sending port according to a matching relationship between the receiving port and the sending port.

The sending port set by the network side device and its corresponding receiving port can be the same or different. Specifically, whether the sending port set by the network side device and its corresponding receiving port are the same can be related to the transmission port type set by the network side device. The transmission port type can be related to fiber ports or electrical ports.

The transmission port type includes unidirectional port and a bidirectional port. The bidirectional port means that the port can send and receive information, and the unidirectional port means that the port can send or receive information.

Taking optical fiber ports as an example, the transmission port types specifically include a single fiber bidirectional port and a dual fiber bidirectional ports.

Figure 5:
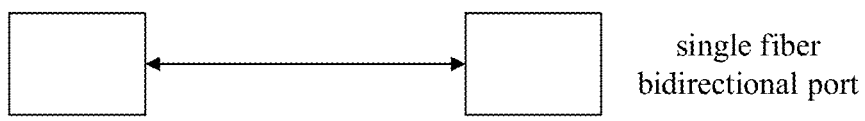
FIG. 5 is a schematic diagram of a single-fiber bidirectional port according to an embodiment of the present disclosure.

If the transmission port type is a single-fiber bidirectional port, as shown in FIG. 5, the sending port and its corresponding receiving port are the same port, that is, sending PTP messages and receiving PTP messages are implemented on the same port, and the sending port can be determined as its corresponding receiving port.

Figure 6:
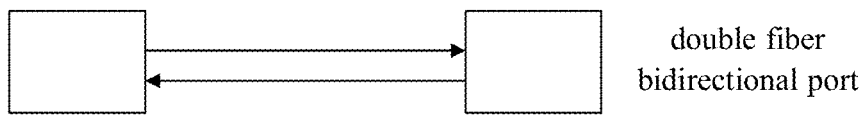
FIG. 6 is a schematic diagram of a dual-fiber bidirectional port according to an embodiment of the present disclosure.

If the sending port type is a dual-fiber bidirectional port, as shown in FIG. 6, the sending port and its corresponding receiving port are not the same port, that is, sending PTP messages and receiving PTP messages are implemented on two paired ports, and the network side device determines the version of the PTP message sent by the network side device on the sending port corresponding to the receiving port according to the version of the PTP message received by the receiving port. The receiving port corresponding to the sending port can be determined according to the pre-saved matching relationship between the receiving port and the sending port.

When the port is an electrical port or other ports, it is similar to that when the port is an optical fiber port according to the transmission port type, which will not be repeated herein.

In the embodiment of the present disclosure, the network side device can determine the receiving port corresponding to the sending port according to the transmission port type, thereby realizing time synchronization.

On the basis of the foregoing embodiments, in the embodiments of the present disclosure, the methods for identifying the PTP version received by the receiving port corresponding to the sending port includes at least one of the following: determining the PTP version used by the second PTP message according to information included in a message field in the second PTP message; determining the PTP version used by the second PTP message according to whether the second PTP message has a Tag Length Value (TLV) extension field; and determining the PTP version used by the second PTP message according to information included in a reserved field in the second PTP message.

The message fields include at least one of the following: a synchronization domain number (domain Number) field, a PTP version (version PTP) field, a grandmaster clock quality (grandmaster clock quality) field, a PTP profile Specific 1 field, and a PTP profile Specific 2 field.

The network side device may obtain the PTP message of the second PTP message by detecting the second PTP message received by the receiving port, so as to determine the PTP version of the sending port when performing information exchange with a corresponding device.

The network side device may determine by one or more of certain specific fields in the received second PTP message, that is, by using at least one of the following methods.

In the first method, the network side device detects the information contained in the message field in the second PTP message to determine the target PTP version. The message field may include a used message field, and the message field includes at least one of the following: a domain Number Field, a version PTP field, a grandmaster Clock Quality field. It is believed that those skilled in the art can determine the target PTP version based on the information contained in the aforementioned used message fields, which is not repeated here.

In the second method, the network side device detects whether the second PTP message has a TLV extension field to determine the target PTP version. It is believed that those skilled in the art can determine the target PTP version according to whether there is a TLV extension field in the second PTP message, which is not repeated here.

In the third method, the network side device determines the target PTP version according to the information contained in the reserved field in the second PTP message. It is believed that those skilled in the art can determine the reserved fields in the PTP message, and determine the target PTP version according to whether the second PTP message has the TLV extension field or not, which is not repeated here.

The network side device can obtain the PTP message of the second PTP message by detecting the second PTP message received by the receiving port, thereby determining the PTP version of the sending port when performing information exchange with the corresponding device, and realizing time synchronization.

On the basis of the foregoing embodiments, in the embodiments of the present disclosure, if the state of the sending port is a master clock, the first PTP message includes at least one of the following: a PTP Announce message, a Sync message, a Follow_Up message, a Delay_Resp message; if the state of the sending port is a slave clock, the first PTP message at least includes a Delay_Req message.

When the network side device sends out PTP messages, the state of the sending port set by the network side device determines the content of the sent PTP message, so before or after the network side device sends the first PTP message using the target PTP version by using the sending port, the network side device may firstly determine the state of the sending port, and then send the corresponding first PTP message according to the state of the sending port.

Specifically, the method further includes: if the receiving port receives a second PTP message, and the second PTP message is a PTP Announce message, determining the state of the sending port according to an optimal master clock algorithm; if the receiving port does not receive the second PTP message, determining that the state of the transmitting port is the master clock.

When the network side device determines the state of the sending port, if it receives a second PTP message through the receiving port, and the second PTP message is a PTP Announce message, the network side device will determine the state of the sending port according to the optimal master clock algorithm, so as to determine that the state of the sending port set by the network side device is the master clock or the slave clock. The process of determining the state of the sending port according to the optimal master clock algorithm belongs to related technologies, and will not be described in detail in the embodiment of the present disclosure. The optimal master clock algorithm may be pre-stored in the network side device.

If the network side device does not receive the second PTP message through the receiving port, the network side device determines that the state of the sending port is the master clock.

When the network side device determines that the state of the sending port is the master clock, the first PTP message includes the PTP Announce message and the Sync message, that is, the sending port is used to send the first PTP version including the PTP Announce message and the Sync message.

When the network side device determines that the state of the sending port is the slave clock, the first PTP message includes the Sync message, that is, the sending port is used to send the first PTP version including the Sync message.

Figure 7:
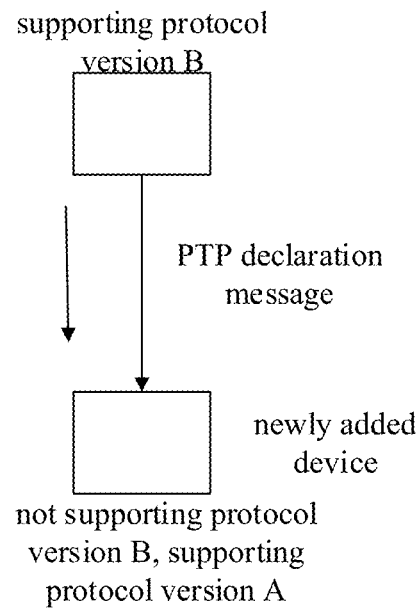
FIG. 7 is a schematic diagram of an old version device joining the network initialization stage provided by an embodiment of the disclosure.

As shown in FIG. 7, there is a synchronized device that supports the new protocol version B (hereinafter referred to as the "new version device"), and a synchronized device that does not support the new protocol version B but supports protocol version A (hereinafter referred to as the "old version device") is newly added to the network and is in the initialization stage. The old version device monitors the PTP Announce message of the new version device, that is, the second PTP message. There are two situations as follows.

The first situation: assuming that the new version device is sending out PTP Announce messages, and the PTP version used by the PTP Announce message is the new version, namely protocol version B, at this time the old version device may not be able to normally receive the new version of the PTP Announce message, the old version device considers that it has not received the PTP Announce message within the set time period. the old version device assumes that it is the master clock, that is its state is determined as the master clock, and sends the first PTP message containing the PTP Announce message and the Sync message using the old version, the new version device receives and detects the first PTP message sent by the old version device, and can use the protocol version A used by the first PTP message to perform normal information exchange.

The second situation: assuming that the old version device does not receive the PTP Announce message sent by the new version device within the set time period, the old version device assumes that it is the master clock and sends the first PTP including the Sync message and the Announce message. After the new version device receives and detects the first PTP message of the old version sent by the old version device, it sends the old version PTP message to the old version device, and then exchanges information normally.

Figure 8:
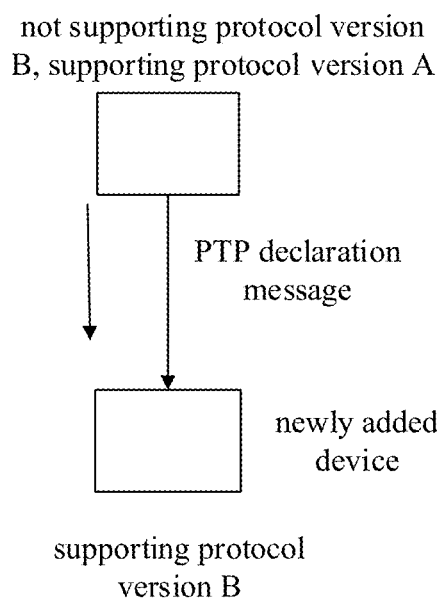
FIG. 8 is a schematic diagram of a new version of a device provided by an embodiment of the disclosure joining the network initialization phase.

As shown in FIG. 8, there is a synchronized device that does not support the new protocol version B but supports the protocol version A (hereinafter referred to as the "old version device"), and a synchronized device that supports the new protocol version B (hereinafter referred to as the "new version device") is newly added to the network and is in the initialization stage. The new version device monitors the PTP Announce message of the old version device, that is, the second PTP message. There are two situations as follows.

The first situation: assuming that the old version device is sending out PTP Announce messages, and then the new version device can normally receive messages of the old version. After the new version device receives and detects the old version of the PTP message sent by the old version device, that is, the second PTP message, it sends the old version of the first PTP message to the old version device. At this time the old version device can exchange information with the new version device normally.

The second situation: assuming that the new version device does not receive the PTP Announce message sent by the old version device within the set time period, the new version device assumes that it is the master clock and sends the Sync message and the Announce message. The old version device cannot receive the new version information normally, the old version device will still send the PTP Announce message on this port within a certain time period, until the new version device receives and detects the PTP information sent by the old version device, and sends back the old version information. At this time, the old version device can exchange information normally with the new version device.

In the embodiments of the present disclosure, the network side device may first determine the state of the sending port, and determine the content of the sent PTP message according to the state, thereby realizing time synchronization between devices.

On the basis of the foregoing embodiments, in the embodiments of the present disclosure, any one of the following methods may be used to determine whether the second PTP message is received.

When determining whether the receiving port receives the second PTP message within the preset time period, the determining whether the receiving port corresponding to the sending port receives the second PTP message includes: for the receiving port corresponding to the sending port, determining whether the second PTP message is received within a preset time period; If not, it is determined that the receiving port has not received the second PTP message.

When determining whether the receiving port receives the second PTP message according to the number of unreceived PTP messages, the determining whether the receiving port corresponding to the sending port receives the second PTP message includes: for the receiving port corresponding to the sending port, determining the number of PTP messages not received by the receiving port according to the preset message sending time period and the currently recorded waiting time; determining whether the number of the PTP messages that are not received reaches a preset number threshold; if yes, determining that the receiving port has not received the second PTP message; if not, determining that the receiving port has received the second PTP message.

The network side device can determine whether the receiving port corresponding to the sending port receives the second PTP message according to whether the PTP message is received within the set time period, or it can determine whether the receiving port corresponding to the sending port has received the second PTP message according to the number of PTP messages that have not been received.

If the network side device determines whether the receiving port corresponding to the sending port has received the second PTP message according to whether the second PTP message is received within the preset time period, the network side device stores the preset time period, and the preset time period can be saved for the network side device, that is, the preset time period corresponding to each receiving port in the network side device is the same, and the preset time period can also be saved for each receiving port in the network side device, that is, the preset time period corresponding to each receiving port in the network side device is the same or different.

The preset time period can be any length of time period, such as 5 seconds or 10 seconds, etc. The preset time period can be the same or different for each determination period. For example, the preset time period in the previous period of the current period is 10 seconds. The preset time period in the current period is 5 seconds.

The preset time period may be manually inputted by a network maintenance personnel, or may be determined by the network side device.

If the preset time period is determined by the network side device, the preset time period is determined according to a message transmission period and a preset number of PTP messages. Specifically, the product of the message transmission period and the preset number of PTP messages may be determined as the preset time period, or the preset time period may be determined according to the message transmission period, the preset number of PTP messages, and a preset time period determination algorithm.

If the network side device determines whether the receiving port corresponding to the sending port has received the second PTP message according to the number of unreceived PTP messages, a message sending period set in the network side device may be such as 125 milliseconds (ms) or 1 second, etc. The message sending period set in the network side device can be configured by the network maintenance personnel according to the time synchronization requirements to the network side device, or it can be determined by the network side device according to the length of time between any two previously received messages, it may be obtained according to a parameter characterizing the message period carried in a message previously received by the network side device, etc., which is not limited here.

The network side device can record the current waiting time for the receiving port corresponding to the sending port. The network side device can re-record the waiting time from the last time it receives the PTP message, or it can start recording the waiting time after accessing the network at the first time.

The network side device determines the number of the PTP messages not received by the receiving port according to the preset message sending period and the currently recorded waiting time, which can be the correspondence among the message sending period and waiting time and the number of unreceived PTP messages. The number of the PTP messages can be the waiting time divided by the message sending period, and the number of PTP messages not received by the receiving port can be determined according to the obtained quotient.

A preset number threshold is stored in the network side device, and the number threshold can be any positive integer, for example, the number threshold is 3 or 5, etc. After determining the number of unreceived PTP messages, the network side device can determine whether the number of received PTP messages reaches a preset number threshold, and if yes, it determines that the receiving port has not received the second PTP message.

In the embodiment of the present disclosure, the network side device can determine whether the receiving port corresponding to the sending port receives the second PTP message, thereby determining the PTP version of the sending port corresponding to the receiving port according to the determination result, and realizing time synchronization.

On the basis of the foregoing embodiments, in the embodiments of the present disclosure, the determination of the PTP version of the sending port is determined by the network side device in the initialization phase; or the determination of the PTP version of the sending port is periodically detected and determined by the network side device in the time synchronization phase.

The network side device can implement the detection mechanism of the PTP version to achieve time synchronization in the initialization phase, or it can perform periodic detection during the PTP clock synchronization process to achieve time synchronization, which improves the flexibility of time synchronization.

If the network side device implements the detection mechanism of the PTP version to achieve time synchronization in the initialization phase, the network side device can determine whether it is in the initialization phase, and when it is determined that it is in the initialization phase, it performs the process of determining the PTP version of the sending port.

If it is determined that the PTP version of the sending port is determined by the network side device in the initialization phase, the second PTP message includes a PTP Announce message.

If the network side device performs periodic detection during the PTP clock synchronization process to achieve time synchronization, the network side device can perform the process of determining the PTP version of the sending port according to the set time period.

If the network side device implements the detection mechanism of the PTP version to achieve time synchronization in the initialization phase, then according to the PTP clock, that is the initialization process of the network side device, when a clock is on, it listens to the PTP Announce from the master clock within the time period specified by the system message. If a PTP Announce message is received, the state is determined according to the optimal master clock algorithm; if no PTP Announce message is received within this period, the clock assumes that it is the master clock and sends the PTP message including a Sync message and an Announce message. If the state determined by the optimal master clock algorithm is the master clock, the PTP message including the Sync message and the Announce message is sent periodically; if it is a slave clock, it periodically interacts with the master clock to adjust the local time.

If the network side device periodically detects and implements time synchronization, it can flexibly adjust the PTP version of the PTP message sent by the sending port. For example, the device sends a new version of the PTP message through the port. In the subsequent process, it receives the lower version PTP message sent by the opposite device, and the device adjusts the version of the PTP message sent on the port to the lower version. On the contrary, the device sends out lower version PTP messages on this port. In the subsequent process, it receives a new version of the PTP message sent by the opposite device, and the device adjusts the version of the PTP message sent on the port to the new version.

In the embodiments of the present disclosure, the network side device can execute the detection mechanism of the PTP version in the initialization phase to achieve time synchronization, or it can perform periodic detection during the PTP clock synchronization process to achieve time synchronization, which improves the flexibility of time synchronization.

Figure 9:
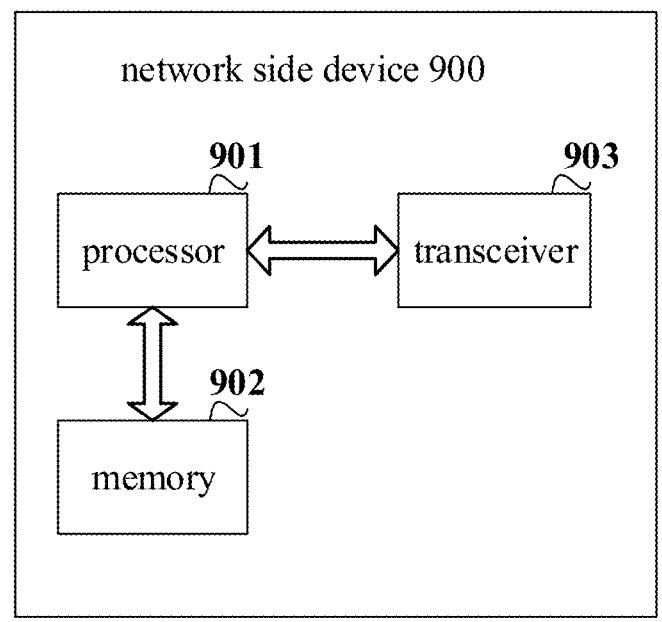
FIG. 9 is a schematic structural diagram of a network side device provided by an embodiment of the disclosure.

On the basis of the foregoing embodiments, an embodiment of the present disclosure also provides a network side device 900, as shown in FIG. 9, including: a processor 901, a memory 902, and a transceiver 903.

The processor 901 is configured to execute the program stored in the memory 902, and execute the following process: determining a PTP version of a sending port set by a network side device; controlling the transceiver to send a first PTP message that uses the PTP version of the sending port through the sending port.

Based on the same inventive concept, the embodiments of the present disclosure also provide a network side device. Since the above-mentioned network side device solves the problem in principle similar to the message transmission method, the implementation of the above-mentioned network side device can refer to the implementation of the method, which is not repeated here.

In FIG. 9, the bus architecture may include any number of interconnected buses and bridges. Specifically, various circuits of such as one or more processors represented by the processor 901 and the memory represented by the memory 902 are linked together. The bus architecture can also link various other circuits such as peripherals, voltage regulators, power management circuits, etc., which are all known in the art, and therefore, no further description will be given herein. The transceiver 903 may be a plurality of elements, that is, including a transmitter and a receiver, and provide a unit for communicating with various other devices on the transmission medium. The processor 901 is responsible for managing the bus architecture and general processing, and the memory 902 can store data used by the processor 901 when performing operations.

Optionally, the processor 901 may be a central processor (CPU), an application specific integrated circuit (ASIC), a field programmable gate array (Field-Programmable Gate Array, FPGA) or a complex programmable logic device (Complex Programmable Logic Device, CPLD).

The processor 901 is specifically configured to determine PTP versions of at least two sending ports that are the same or different, where the number of sending ports is at least two.

The first PTP message includes at least one of the following: a PTP Announce message, a Sync message, a Follow_Up message, a Delay_Req message, a Delay_Resp message.

If the state of the sending port is a master clock, the first PTP message includes at least one of the following: a PTP Announce message, a Sync message, a Follow_Up message, a Delay_Resp message; if the state of the sending port is a slave clock, the first PTP message at least includes a Delay_Req message.

The processor 901 is specifically configured to determine the identified PTP version used by the second PTP message received by the receiving port corresponding to the sending port as the PTP version of the sending port; or determine the PTP version specified by the network side device as the PTP version of the sending port.

The processor 901 is further configured to determine whether the receiving port corresponding to the sending port has received a second PTP message before determining the PTP version of the sending port.

The second PTP message includes at least one of the following: a PTP Announce message, a Sync message, a Follow_Up message, a Delay_Req message, a Delay_Resp message.

The processor 901 is specifically configured to, if the transmission port type set by the network side device is a bidirectional port, determine the sending port as its corresponding receiving port; and if the transmission port type set by the network side device is a unidirectional port, determine the receiving port corresponding to the sending port according to the matching relationship between the receiving port and the sending port.

The processor 901 is specifically configured to identify the PTP version used by the second PTP message received by the receiving port corresponding to the sending port according to at least one of: determining the PTP version used by the second PTP message according to information included in a message field in the second PTP message; determining the PTP version used by the second PTP message according to whether the second PTP message has a Tag Length Value (TLV) extension field; and determining the PTP version used by the second PTP message according to information included in a reserved field in the second PTP message.

The message fields include at least one of the following: a synchronization domain number (domain Number) field, a PTP version (version PTP) field, a grandmaster clock quality (grandmaster clock quality) field, a PTP profile Specific 1 field, and a PTP profile Specific 2 field.

The processor 901 is specifically configured to determine the PTP version of the sending port in the initialization phase or determine the PTP version of the sending port by periodic detection in the time synchronization phase.

The processor 901 is further configured to, if the receiving port has received the second PTP message, and the second PTP message is a PTP Announce message, the state of the sending port is determined according to the optimal master clock algorithm; and if the receiving port has not received the second PTP message, it is determined that the state of the sending port is the master clock.

The processor 901 is specifically configured to determine whether the second PTP message is received within a preset time period for the receiving port corresponding to the sending port; if not, determining that the receiving port has not received the second PTP message.

The preset time period is determined according to the message transmission period and the preset number of PTP messages.

In the embodiments of the present disclosure, the network side device can determine the sending port for communicating with the opposite device, and send the PTP message that uses the PTP version of the determined sending port through the sending port, without additional manual configuration, thereby improving efficiency and accuracy, and improving maintainability.

Figure 10:
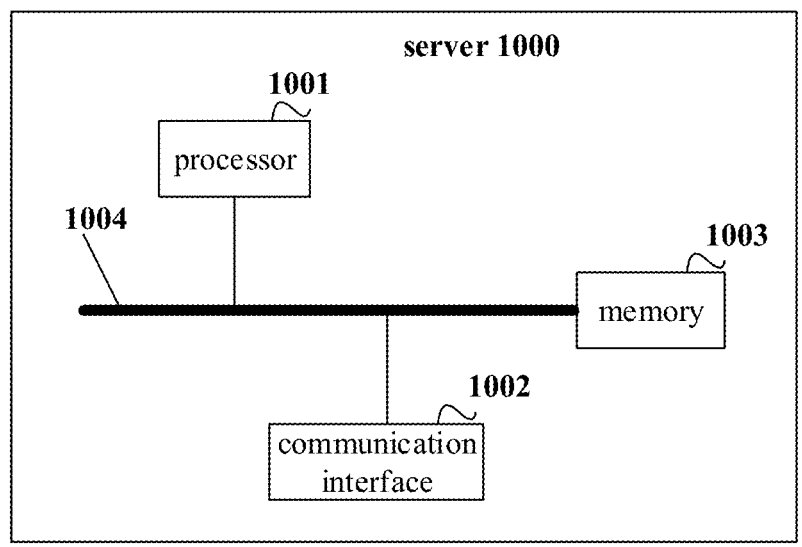
FIG. 10 is a schematic structural diagram of a network side device provided by an embodiment of the disclosure.

On the basis of the foregoing embodiments, an embodiment of the present disclosure also provides a network side device 1000, as shown in FIG. 10, including: a processor 1001, a communication interface 1002, a memory 1003, and a communication bus 1004, where the processor 1001, communication interface 1002, memory 1003 completes mutual communication through communication bus 1004.

The memory 1003 stores a computer program, and when the computer program is executed by the processor 1001, the processor 1001 performs the following steps: determining a PTP version of a sending port for the sending port set by a network side device; sending the first PTP message that uses the PTP version of the sending port through the sending port.

The communication bus mentioned by the aforementioned network side device may be a Peripheral Component Interconnect (PCI) bus or an Extended Industry Standard Architecture (Extended Industry Standard Architecture, EISA) bus. The communication bus can be divided into address bus, data bus, control bus, etc. For ease of representation, only one thick line is used in the drawing, but it does not mean that there is only one bus or one type of bus.

The communication interface 1002 is used for communication between the aforementioned network side device and other devices.

The memory may include a random access memory (Random Access Memory, RAM), and may also include a non-volatile memory (Non-Volatile Memory, NVM), such as at least one disk memory. Optionally, the memory may also be at least one storage device located far away from the foregoing processor.

The above-mentioned processor may be a general-purpose processor, including a central processing unit, a network processor (Network Processor, NP), etc.; it may also be a digital instruction processor (Digital Signal Processing, DSP), an application specific integrated circuit, a field programmable gate display, or other programmable logic devices, discrete gate or transistor logic devices, discrete hardware components, etc.

In the embodiment of the present disclosure, when the processor executes the program stored in the memory, it determines the sending port for communicating with the opposite device, and sends the PTP message that uses the PTP version of the determined sending port through the sending port, without additional manual configuration, thereby improving efficiency and accuracy, and improving maintainability.

On the basis of the above-mentioned embodiments, the embodiments of the present disclosure also provide a computer-readable storage medium that stores a computer program that can be executed by a network side device. When the program is executed on the network side device, the following steps are realized: determining a PTP version of a sending port set by a network side device; sending a first PTP message that uses the PTP version of the sending port through the sending port.

The above-mentioned computer-readable storage medium may be any available medium or data storage device that can be accessed by the processor in the network side device, including but not limited to a magnetic storage such as a floppy disk, a hard disk, a magnetic tape, a magneto-optical disk (MO), etc., an optical storage such as CD, DVD, BD, HVD, etc., and a semiconductor memory such as ROM, EPROM, EEPROM, non-volatile memory (NAND FLASH), solid state drive (SSD), etc.

A computer program is stored in the computer-readable storage medium provided in the embodiment of the present disclosure. When the computer program is executed by the processor, it realizes the process of determining a PTP version of a sending port set by a network side device; sending a first PTP message that uses the PTP version of the sending port through the sending port, without additional manual configuration, thereby improving efficiency and accuracy, and improving maintainability.

Figure 11:
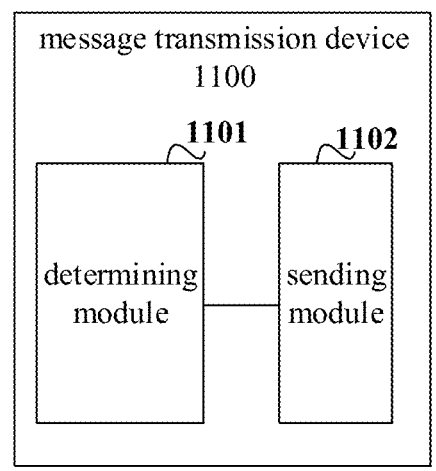
FIG. 11 is a schematic diagram of a message transmission device provided by an embodiment of the disclosure.

FIG. 11 is a schematic diagram of a message transmission device 1100 provided by an embodiment of the disclosure, which is applied to a network side device, and includes: a determining module 1101, configured to determine a PTP version of a sending port set by a network side device; a sending module 1102 is configured to send a first PTP message that uses the PTP version of the sending port through the sending port.

If the number of the sending ports is at least two, the determined PTP versions of the at least two sending ports are the same or different.

The first PTP message includes at least one of the following: a PTP Announce message, a Sync message, a Follow_Up message, a Delay_Req message, a Delay_Resp message.

If the state of the sending port is a master clock, the first PTP message includes at least one of the following: a PTP Announce message, a Sync message, a Follow_Up message, a Delay_Resp message; if the state of the sending port is a slave clock, the first PTP message at least includes a Delay_Req message.

The determining module is specifically configured to determine the identified PTP version used by the second PTP message received by the receiving port corresponding to the sending port as the PTP version of the sending port; or determine the PTP version specified by the network side device as the PTP version of the sending port.

The determining module is further configured to determine whether the receiving port corresponding to the sending port has received a second PTP message before determining the PTP version of the sending port.

The second PTP message includes at least one of the following: a PTP Announce message, a Sync message, a Follow_Up message, a Delay_Req message, a Delay_Resp message.

The determining module is specifically configured to, if the transmission port type set by the network side device is a bidirectional port, determine the sending port as its corresponding receiving port; and if the transmission port type set by the network side device is a unidirectional port, determine the receiving port corresponding to the sending port according to the matching relationship between the receiving port and the sending port.

The determining module is specifically configured to identify the PTP version used by the second PTP message received by the receiving port corresponding to the sending port, including at least one of the following: determining the PTP version used by the second PTP message according to information included in a message field in the second PTP message; determining the PTP version used by the second PTP message according to whether the second PTP message has a Tag Length Value (TLV) extension field; and determining the PTP version used by the second PTP message according to information included in a reserved field in the second PTP message.

The message fields include at least one of the following: a synchronization domain number (domain Number) field, a PTP version (version PTP) field, a grandmaster clock quality (grandmaster clock quality) field, a PTP profile Specific 1 field, and a PTP profile Specific 2 field.

The determining module is specifically configured to determine the PTP version of the sending port in the initialization phase or determine the PTP version of the sending port by periodic detection in the time synchronization phase.

If the PTP version of the sending port is determined by the network side device in the initialization phase, the second PTP message includes a PTP Announce message.

The determining module is further configured to, if the receiving port has received the second PTP message, and the second PTP message is a PTP Announce message, determine the state of the sending port according to the optimal master clock algorithm; and if the receiving port has not received the second PTP message, determine that the state of the sending port is the master clock.

The determining module is specifically configured to determine whether the second PTP message is received within a preset time period for the receiving port corresponding to the sending port; if not, determining that the receiving port has not received the second PTP message.

The preset time period is determined according to the message transmission period and the preset number of PTP messages.

In the embodiments of the present disclosure, the network side device can determine the sending port for communicating with the opposite device, and send the PTP message that uses the PTP version of the determined sending port through the sending port, without additional manual configuration, thereby improving efficiency and accuracy, and improving maintainability.

As for the system/device embodiment, since it is basically similar to the method embodiment, the description thereof is relatively simple, and the related part of the description of the method embodiment may be referred.

Those skilled in the art should understand that the embodiments of the present disclosure can be provided as methods, systems, or computer program products. Therefore, the present disclosure may adopt the form of a complete hardware embodiment, a complete software embodiment, or an embodiment combining software and hardware. Moreover, the present disclosure may take the form of a computer program product implemented on one or more computer-usable storage media (including but not limited to a disk storage, a CD-ROM, an optical storage, etc.) containing computer-usable program codes.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be realized by computer program instructions. These computer program instructions can be provided to the processor of a general-purpose computer, a special-purpose computer, an embedded processor, or other programmable data processing equipment to generate a machine, so that the instructions executed by the processor of the computer or other programmable data processing equipment are generated so as to realize the functions specified in one process or multiple processes in the flowchart and/or one block or multiple blocks in the block diagram.

These computer program instructions can also be stored in a computer-readable memory that can guide a computer or other programmable data processing equipment to work in a specific manner, so that the instructions stored in the computer-readable memory produce an article of manufacture including the instruction device. The device implements the functions specified in one process or multiple processes in the flowchart and/or one block or multiple blocks in the block diagram.

These computer program instructions can also be loaded on a computer or other programmable data processing equipment, so that a series of operation steps are executed on the computer or other programmable equipment to produce computer-implemented processing, so that the instructions executed on the computer or other programmable equipment provide steps for implementing functions specified in a flow or multiple flows in the flowchart and/or a block or multiple blocks in the block diagram.

Although the optional embodiments of the present disclosure have been described, those skilled in the art can make additional changes and modifications to these embodiments once they learn the basic creative concept. Therefore, the appended claims are intended to be interpreted as including optional embodiments and all changes and modifications falling within the scope of the present disclosure.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent technologies, the present disclosure also intends to include these changes and modifications and variations.

What is claimed is:

1. A message transmission method applied to a network side device, comprising:
    determining a Precision Time Protocol (PTP) version of a sending port set by a network side device;
    sending a first PTP message that uses the PTP version of the sending port through the sending port;
    wherein the determining the PTP version of the sending port comprises:
    determining an identified PTP version used by a second PTP message received by a receiving port corresponding to the sending port as the PTP version of the sending port, wherein the PTP version of the sending port is the same as the PTP version used by the second PTP message, and both the sending port and the receiving port are ports of the same network side device.

2. The method according to claim 1, wherein if a number of the sending ports is at least two, the determined PTP versions of the at least two sending ports are the same or different.

3. The method according to claim 1, wherein the first PTP message comprises at least one of the following: a PTP Announce message, a Sync message, a Follow_Up message, a Delay_Req message, a Delay_Resp message.

4. The method according to claim 1, wherein if a state of the sending port is a master clock, the first PTP message includes at least one of the following: a PTP Announce message, a Sync message, a Follow_Up message, a Delay_Resp message; if the state of the sending port is a slave clock, the first PTP message at least includes a Delay_Req message.

5. The method according to claim 1, wherein before the determining the PTP version of the sending port, the method further comprises:
    determining whether the receiving port corresponding to the sending port has received the second PTP message.

6. The method according to claim 1, wherein the second PTP message comprises at least one of the following: a PTP Announce message, a Sync message, a Follow_Up message, a Delay_Req message, a Delay_Resp message.

7. The method according to claim 1, wherein determining the receiving port corresponding to the sending port comprises:
    if a transmission port type set by the network side device is a bidirectional port, determining the sending port as the receiving port corresponding to the sending port; and
    if a transmission port type set by the network side device is a unidirectional port, determining the receiving port corresponding to the sending port according to a matching relationship between the receiving port and the sending port.

8. The method according to claim 1, wherein the identifying the PTP version used by the second PTP message received by the receiving port corresponding to the sending port comprises at least one of:
    determining the PTP version used by the second PTP message according to information included in a message field in the second PTP message;
    determining the PTP version used by the second PTP message according to whether the second PTP message has a Tag Length Value (TLV) extension field; and
    determining the PTP version used by the second PTP message according to information included in a reserved field in the second PTP message.

9. The method according to claim 8, wherein the message field includes at least one of the following: a synchronization domain number field, a PTP version field, and a grandmaster Clock Quality field.

10. The method according to claim 8, wherein the message fields include at least one of a PTP profile Specific 1 field and a PTP profile Specific 2 field.

11. The method according to claim 1, wherein
    the determining the PTP version of the sending port is determined by the network side device in an initialization phase; or
    the determining the PTP version of the sending port is determined through periodic detection by the network side device in a time synchronization phase.

12. The method according to claim 11, wherein if the PTP version of the sending port is determined by the network side device in the initialization phase, the second PTP message includes the PTP Announce message.

13. The method according to claim 1, wherein the method further comprises:
    if the receiving port has received the second PTP message, and the second PTP message is the PTP Announce message, determining the state of the sending port according to an optimal master clock algorithm; and
    if the receiving port has not received the second PTP message, determining that the state of the sending port is a master clock.

14. The method according to claim 1, wherein the determining whether the receiving port corresponding to the sending port has received the second PTP message comprises:
    for the receiving port corresponding to the sending port, determining whether the second PTP message is received within a preset time period;
    if no, determining that the receiving port has not received the second PTP message.

15. The method according to claim 14, wherein the preset time period is determined according to a message transmission period and a preset number of PTP messages.

16. A network side device, comprising a memory, a processor, and a transceiver, wherein
    the processor is configured to read the program in the memory, and execute the following process:
    determining a Precision Time Protocol (PTP) version of a sending port set by a network side device;
    controlling the transceiver to send a first PTP message that uses the PTP version of the sending port through the sending port;
    wherein the processor is specifically configured to determine an identified PTP version used by the second PTP message received by a receiving port corresponding to the sending port as the PTP version of the sending port, wherein the PTP version of the sending port is the same as the PTP version used by the second PTP message, and both the sending port and the receiving port are ports of the same network side device.

17. The network side device according to claim 16, wherein the processor is specifically configured to determine PTP versions of at least two sending ports that are the same or different, wherein a number of sending ports is at least two.

18. The network side device according to claim 16, wherein the processor is further configured to determine whether the receiving port corresponding to the sending port has received a second PTP message before determining the PTP version of the sending port.

* * * * *